(12) United States Patent
Satpathy et al.

(10) Patent No.: US 10,917,251 B2
(45) Date of Patent: Feb. 9, 2021

(54) APPARATUS AND METHOD FOR GENERATING HYBRID STATIC/DYNAMIC ENTROPY PHYSICALLY UNCLONABLE FUNCTION

(71) Applicant: Intel Corporation, Santa Clara, CA (US)

(72) Inventors: Sudhir Satpathy, Hillsboro, OR (US); Vikram Suresh, Portland, OR (US); Sanu Mathew, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 15/942,181

(22) Filed: Mar. 30, 2018

(65) Prior Publication Data
US 2019/0305970 A1   Oct. 3, 2019

(51) Int. Cl.
*H04L 9/08*     (2006.01)
*H04L 9/32*     (2006.01)
*H04L 9/00*     (2006.01)
*G06F 7/58*     (2006.01)

(52) U.S. Cl.
CPC ............ *H04L 9/3278* (2013.01); *H04L 9/006* (2013.01); *G06F 7/588* (2013.01)

(58) Field of Classification Search
None
See application file for complete search history.

(56) References Cited

U.S. PATENT DOCUMENTS

| | | | |
|---|---|---|---|
| 9,279,850 B1* | 3/2016 | Pedersen | H03K 19/003 |
| 10,027,492 B1* | 7/2018 | Wesselkamper | H04L 9/0866 |
| 2016/0182045 A1* | 6/2016 | Mai | G09C 1/00 326/8 |
| 2016/0285639 A1* | 9/2016 | Mathew | G06Q 10/08 |

* cited by examiner

*Primary Examiner* — Fatoumata Traore
(74) *Attorney, Agent, or Firm* — Green, Howard & Mughal LLP (57) ABSTRACT

An apparatus is provided which comprises: an entropy source to produce a first random sequence of bits, wherein the entropy source comprises an array of bi-stable cross-coupled inverter cells; a first circuitry coupled to the entropy source, wherein the first circuitry to generate an entropy source selection set; and a second circuitry coupled to the entropy source and the first circuitry, wherein the second circuitry is to receive the first random sequence and the entropy source selection set, and wherein the second circuitry is to generate a second random sequence.

23 Claims, 9 Drawing Sheets

Fig. 9

APPARATUS AND METHOD FOR GENERATING HYBRID STATIC/DYNAMIC ENTROPY PHYSICALLY UNCLONABLE FUNCTION

BACKGROUND

Static and dynamic entropy generation circuits are key primitives that provide the foundation for security and trust in all cryptographic applications. Physically Unclonable Function (PUF) and true random number generators (TRNG) are two of the most popular approaches to harvest static and dynamic entropy respectively. Static entropy (PUF) manifests in the form of a unique response (e.g., identification ID) that can be repeatedly created with high accuracy for every device instance and can be reliably used for chip identification and root of trust. This is accomplished by exploiting manufacturing induced variation with circuits/techniques that enhance/reinforce such spatial instance specific random mismatch and suppress temporal variability (e.g., thermal noise). Dynamic entropy circuits on the other hand, subdue spatial process/manufacturing induced variation to amplify the influence of temporal random sources of variation. Such contrasting design criteria require separate implementations of these critical security primitives increasing die area and design time/cost.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Some embodiments describe a hybrid approach that enables unified PUF and TRNG implementation by leveraging the same entropy source, and optimal peripheral and conditioning logic reuse in both modes of operation for area saving. In a conventional approach, raw bits generated from a TRNG undergo Advanced Encryption Standard (AES) and Secure Hash Algorithms (SHA) based entropy extraction incurring additional latency and area overhead. The hybrid solution of some embodiments takes advantage of the presence of multiple entropy sources to replace conventional AES with a light-weight hierarchical Von-Neumann (VN) extractor that not only saves area, but also filters out non-random components improving the quality of the final output.

Many public-key infrastructure (PKI) protocols (for e.g., Universal Serial Bus (USB) authentication) need in-line private key generation and digital signature generation/authentication (ECDSA) with high quality random nonce, seed etc., requiring both PUF and TRNG functionality. The increased die area and design time makes separate implementations prohibitively expensive for cost constrained Internet-of-Things (IoT) and small form-factor platforms. The secret keys and certificates are instead programmed into these devices using One-time Programmable (OTP) fuses post fabrication creating security loopholes that an attacker can exploit to extract or manipulate secret information. As an alternative, the approach of various embodiments enables significant area savings by combining critical PUF and TRNG hardware, providing opportunity to eliminate security loopholes arising out of third party intervention. Other technical effects will be evident from the various figures and embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference through-out this specification to "an embodiment" or "one embodiment" or "some embodiments" means that a particular feature, structure, function, or characteristic described in connection with the embodiment is included in at least one embodiment of the invention. Thus, the appearances of the phrase "in an embodiment" or "in one embodiment" or "some embodiments" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The term "device" may generally refer to an apparatus according to the context of the usage of that term. For example, a device may refer to a stack of layers or structures, a single structure or layer, a connection of various structures having active and/or passive elements, etc. Generally a device is a three dimensional structure with a plane along the x-y direction and a height along the z direction of an x-y-z Cartesian coordinate system. The plane of the device may also be the plane of an apparatus which comprises the device.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy. For example in the context of materials, one material or material disposed over or under another may be directly in contact or may have one or more intervening materials. Moreover, one material disposed between two materials may be directly in contact with the two layers or may have one or more intervening layers. In contrast, a first material "on" a second material is in direct contact with that second material/material. Similar distinctions are to be made in the context of component assemblies.

The terms "left," "right," "front," "back," "top," and "bottom" and the like in the description and in the claims, if any, are used for descriptive purposes and not necessarily for describing permanent relative positions.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The term "between" may be employed in the context of the z-axis, x-axis or y-axis of a device. A material that is between two other materials may be in contact with one or both of those materials, or it may be separated from both of the other two materials by one or more intervening materials. A material that is between two other materials may be in contact with one or both of those materials, or it may be separated from both of the other two materials by one or more intervening materials, either temporally, spatially, in ranking or connected to one or both of those devices, or it may be separated from both of the other two devices by one or more intervening devices.

It is pointed out that those elements of the figures having the same reference numbers (or names) as the elements of any other figure can operate or function in any manner similar to that described, but are not limited to such.

Figure 1:
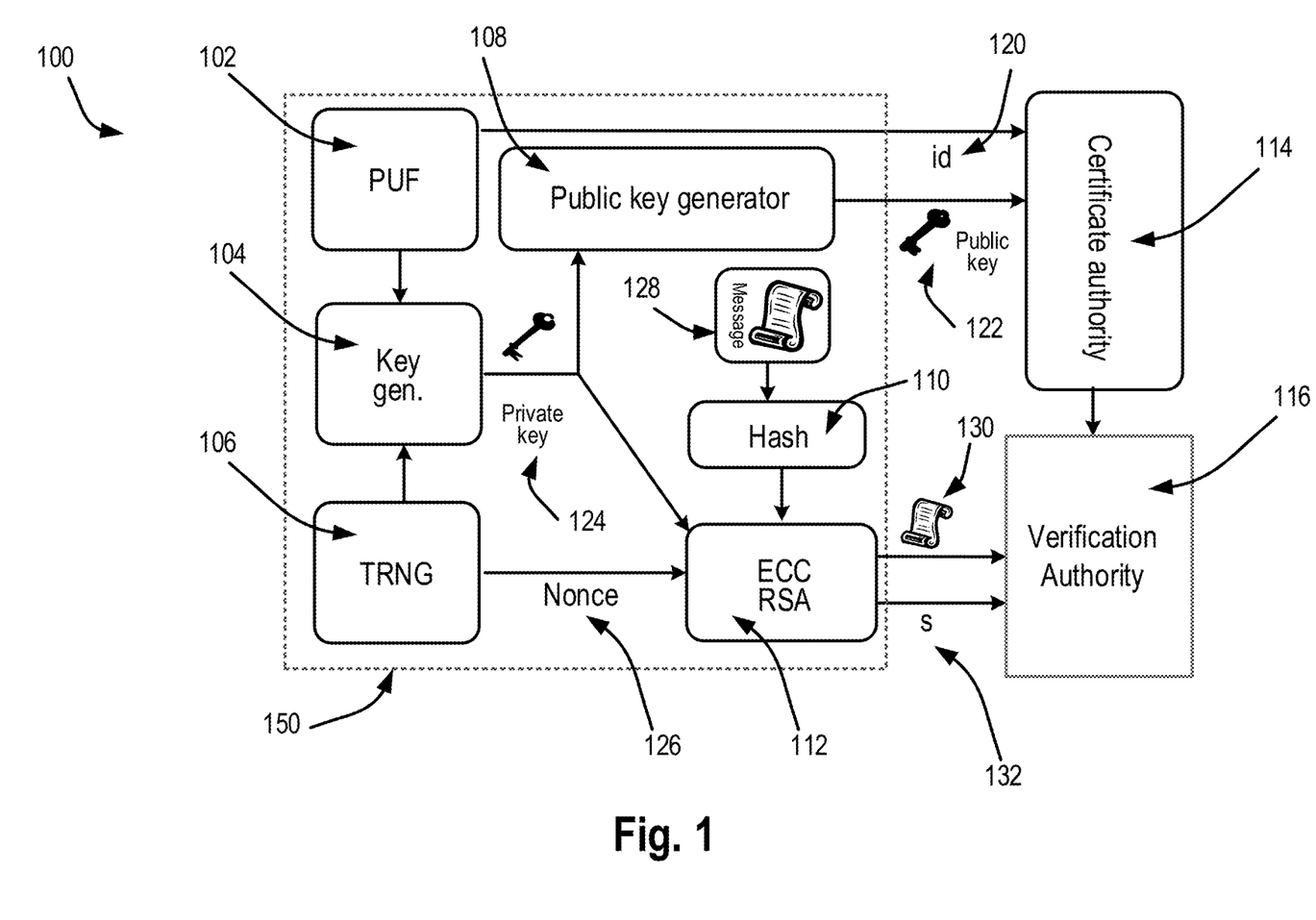
FIG. 1 illustrates a Public Key Infrastructure (PKI) diagram according to some embodiments.

FIG. 1 illustrates a Public Key Infrastructure (PKI) diagram 100 according to some embodiments of the disclosure. One purpose of PKI is to provide the means for a secure digital transfer of information. It is used in activities and digital transfer of information when simple passwords are not an adequate authentication method and a stronger proof is used to confirm the identity of the parties involved in the communication and to validate the information being transferred. A PKI is a system for the generation, storing, and distribution of digital certificates which are used to certify and verify that a certain public key belongs to a particular entity. In the PKI process, digital certificates are created which map public keys to entities, and these digital certificates are stored in a central repository and can be revokes if needed.

The PKI 100, according to some embodiments, illustrated in FIG. 1 comprises of Internet of Things (IoT) node 150, and Certificate Authority 114 and Verification Authority 116. In some embodiments, the IoT node 150 is to exchange secure messages with the Verification authority 116. In some embodiments, the IoT node 150 comprises of a PUF 102, a TRNG 106, the Error Correction Coder (ECC) and Rivest, Shamir, & Adleman (RSA) circuitry 112, a Private key generator 104, a Public key generator 108, and Hash circuitry 110.

In some embodiments, the PUF 102 and TRNG 106 circuitry are to provide respectively a static and a dynamic entropy input to the private key generator circuitry 104. The private key generator 104 is to generate private keys based on the input from PUF 102 and TRNG 106 circuitry and is to provide the generated private key to the Public key generator 108 and to the ECC (Error Correction Coder) and RSA circuitry 112. The PUF 104 also is to provide a unique "id" 120 to the Certificate authority 114. The Public key generator 104 is to generate a public key 122 based on the input from the private key 124 generated by the Private key generator 104 and is to provide the public key 122 to the Certificate authority 114. The Certificate authority 114 is to issue, store, and sign digital certificates based on the unique "id" 120 and Public key 122. A Verification Authority 116 is to verify the identity of entities requesting their digital certificates, provided by the Certificate authority 114. The message to be sent is first hashed by the Hash circuitry 110 and then encrypted by the ECC/RSA circuitry 112 using the Private Key 124, and the Nonce 126. In cryptography, a "Nonce" is a random and arbitrary number which can only be used once. Nonce is often a pseudo-random or random number generated in an authentication protocol to ensure that old communications cannot be reused by unauthorized entities or in replay attacks. In some embodiments, the Nonce 126 is to be generated by the TRNG 106. The ECC/RSA circuitry 112 is to send the encrypted message to the Verification authority 116 along with an encrypted signature "s" 132. The Verification authority 116 is to verify the digital certificate and is to decrypt the message 130 using the public key 122, and the encrypted signature input "s" 132.

Figure 2:
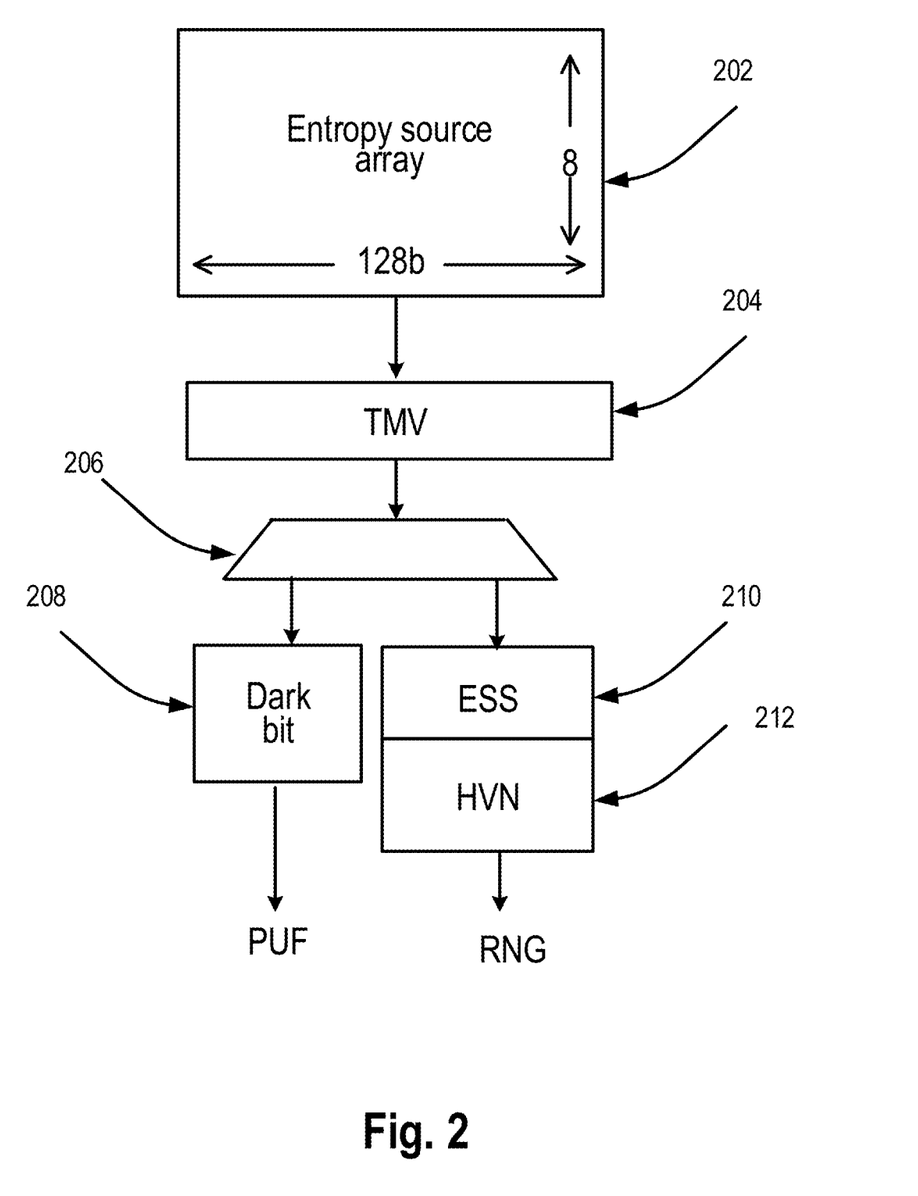
FIG. 2 illustrates a schematic of one embodiment of current invention.

FIG. 2 illustrates a schematic of one embodiment of current invention. The Entropy Source (ES) 202 comprises of PUF array which includes an array of bi-stable cross-coupled inverter cells. In some embodiments, the array comprises of 1024 bits (e.g., 128 bits by 8 bits). Though all cells in the ES 202 array comprise identically laid-out matched devices, random manufacturing induced variation introduces a bias towards 1 or 0 in each cell. Cells that are strongly biased towards a 0 or 1 (e.g,. stable cells) are good candidates for static entropy generation while those that are least biased or unbiased (e.g,. unstable) can be used as sources for dynamic entropy. Unlike prior PUF implementations where, least biased (or unbiased) unstable cells are excluded from key generation, embodiments of the present invention use them for generating a random bit-stream. The raw responses from the ES array 202 are to undergo temporal majority voting by the Temporal Majority Voting (TMV) function 204, wherein the output of each cell is to be accumulated for some consecutive cycles, to quantify their inherent bias.

In some embodiments, each cell is accumulated for some consecutive cycles (e.g., 127 consecutive cycles). The output of the TMV function is to be multiplexed by the multiplexer 206. For static entropy generation, the TMV output is to be received by the Dark bit function 208 to generate the PUF output. Dark bit function may include any circuitry, logic, or other hardware and/or firmware to provide for the assessment of the characteristics of one or more PUF cells in PUF cell array 202, to provide for screening and marking as "dark bits" those PUF cells that are identified to not meet stability requirements, and to provide for the screening and masking of dark bits from use in the generation of PUF key(s). Therefore, dark bit function 208 provides for reduction of the error rate of PUF key generation by discarding or replacing noisy PUF bits.

For dynamic entropy generation, the TMV output is to be received by the Entropy Source Selection (ESS) 210 and Hierarchical Von-Neumann (HVN) extractor functions 212 to generate the RNG (Random Number Generator) output. The Entropy Source Selection (ESS) 210 function is to create a Bias Map based on the input from the TMV function. The Bias Map records the bias associated with each cell in the source array. The most unbiased (e.g,. unstable) entries in the Bias Map are candidates for RNS generation. Although a Bias Map could indicate the presence of a significant number of cells in the ES array that are unstable, not all of them qualify for cryptographic quality random stream generation. In some embodiments, extensive National Institute of Standards and Technology (NIST) randomness test analysis on bit streams generated from a large number of evaluations (e.g., 75K evaluations) of unstable cells indicate that few cells (e.g., only 5 of the 6144 cells) are sufficiently unbiased to generate cryptographic quality entropy. Additionally, the raw streams generated from these best TRNG candidates fail most of the other NIST tests. Hence, these raw streams need to undergo entropy extraction for cryptographic usage. In some embodiments, the Entropy Source Selection (ESS) circuitry 210 generates an entropy source selection set comprising of the top N most unstable entropy sources based on the Bias Map, where N is an integer number. In some embodiments, the Entropy Source Selection (ESS) circuitry 210 generates an entropy source selection set comprising of the 4 most unstable entropy sources based on the Bias Map.

Traditional entropy extractors feature cryptographic cipher and hash hardware like Advanced Encryption Standard (AES), Secure Hash Algorithms (SHA), Galois Field (GF) multiplier, etc., that incur significant logic overhead. Although they operate at fixed throughput, they do not provide any indication about the entropy content of the bit-stream they generate. For example, an AES-128 based extractor operating in Cipher Block Chain (CBC) mode may continuously produce an output stream irrespective of the bias inherently present in its input stream. This results in entropy degradation as the ES array cells age, stabilize or alter behavior over time. In contrast to traditional approaches, the current invention's hybrid design uses a light-weight Von-Neumann (VN) processing based hierarchical architecture 212 that is inherently resilient to bias drift of the ES array.

Figure 3A:
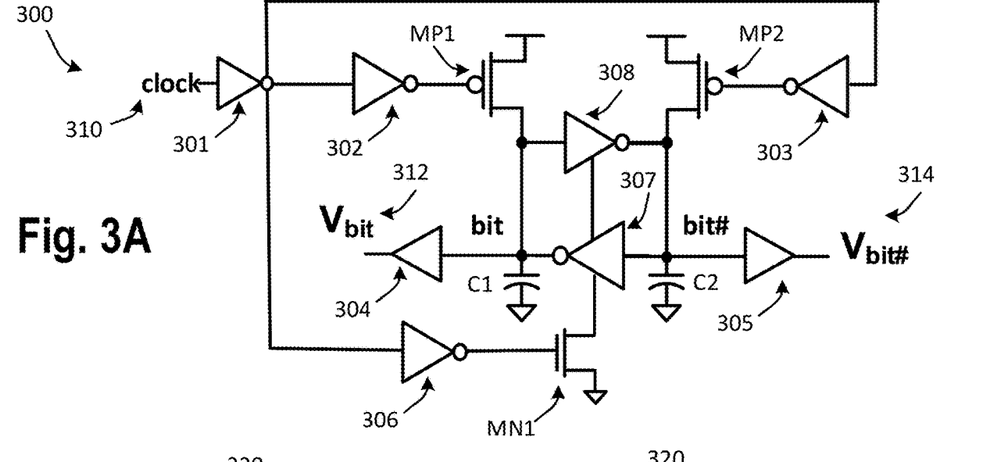
FIG. 3A illustrates a schematic of a bi-stable cross-coupled inverter cell, according to some embodiments.

FIG. 3A illustrates a schematic of a bi-stable cross-coupled inverter cell 300. In some embodiments, bi-stable cross-coupled inverter 300 comprises n-type transistor MN1, p-type transistors MP1, MP2, inverters 301, 302, 303, 306, 307, 308, buffers 304, 305, and capacitors c1, c2, coupled together as shown.

Figure 3B:
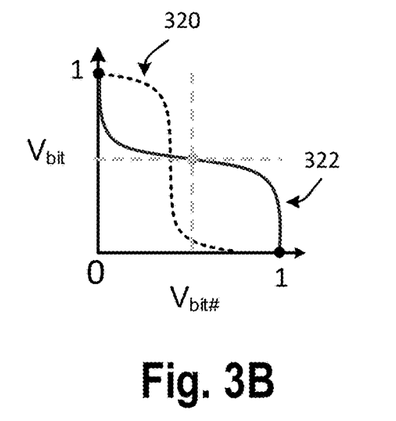
FIG. 3B, FIG. 3C illustrate an output of a cell that is strongly biased towards a 0 or 1, according to some embodiments.
Figure 3C:
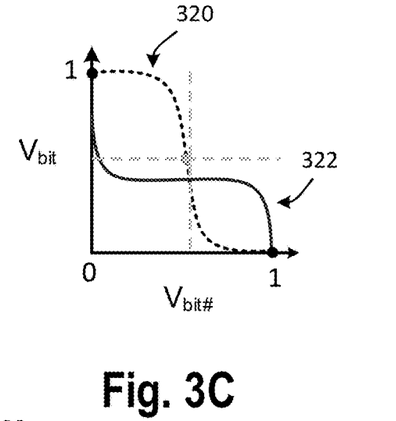
Figure 3D:
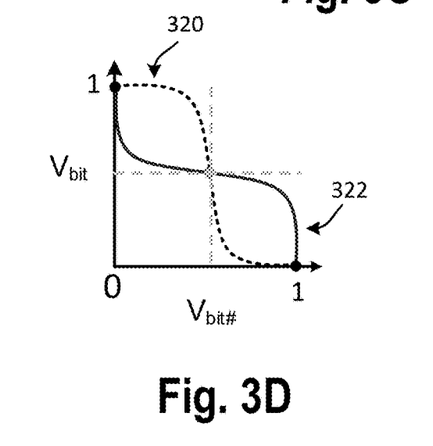
FIG. 3D illustrate the output of a cell that is unbiased towards a 0 or 1, according to some embodiments.

The input to the cell is "clock" 310. One output of the cell is "Vbit" 312, and the inverted output is "Vbit#" 314. Random manufacturing induced variation introduces a bias towards an output of 1 or 0 in each cell. FIG. 3B and FIG. 3C illustrates the output of a cell that are strongly biased towards a 0 or 1. FIG. 3B illustrates a cell output which is biased towards "1". FIG. 3C illustrates a cell output which is biased towards y biased towards a 0sents the output Vbit and curve 322 represents the output Vbit#. Such cells are good candidates for static entropy generation, such as a PUF. FIG. 3D shows the output of a cell that is unbiased or least biased. Curve 320 represents the output Vbit and curve 322 represents the output Vbit#. Such cells are good candidates as sources for dynamic entropy, which are used in some embodiments.

Figure 4:
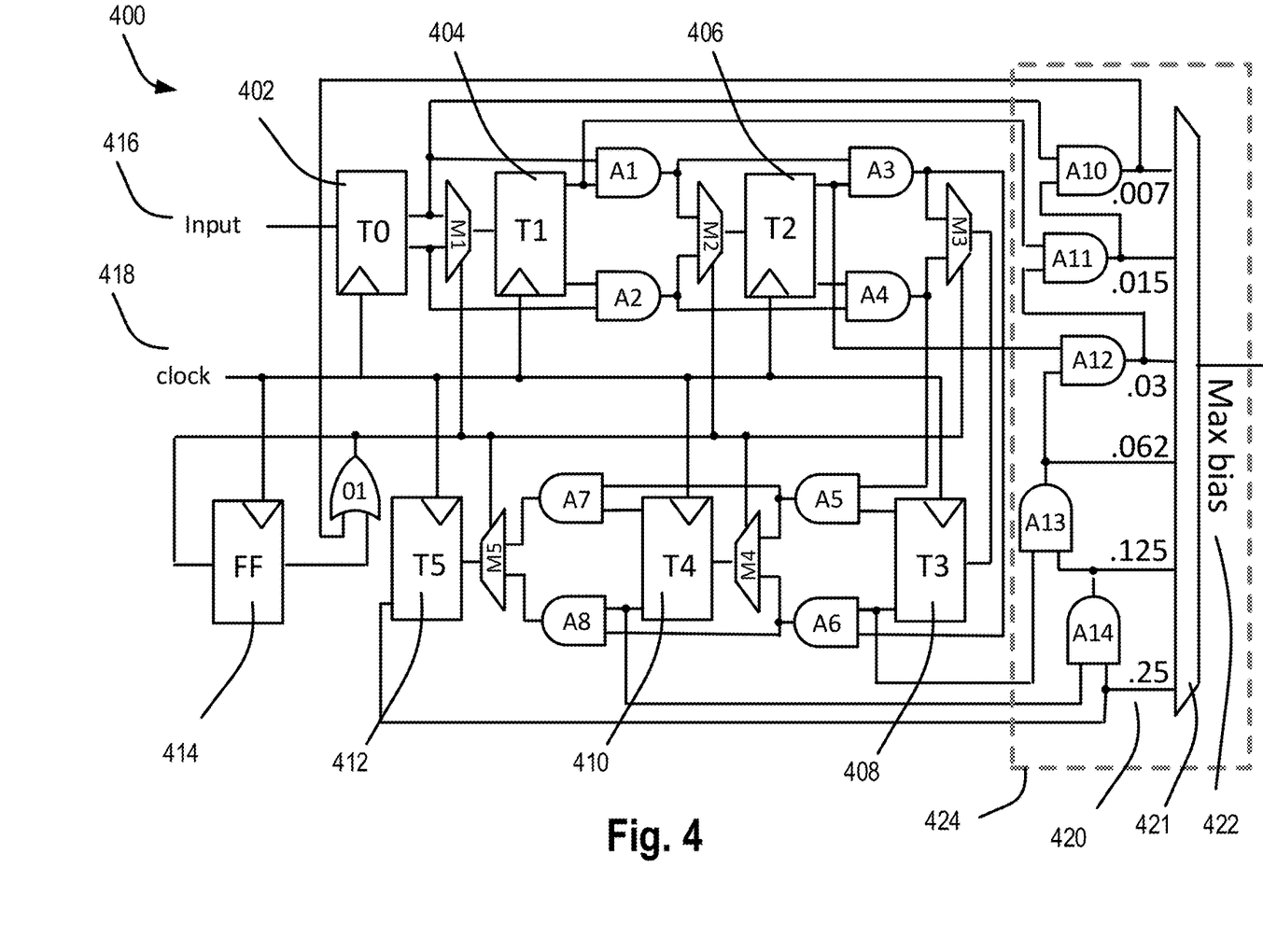
FIG. 4 illustrates a circuit diagram for a Temporal majority voting (TMV) counter with integrated bias quantification circuitry, according to some embodiments.

FIG. 4 illustrates a circuit diagram for a Temporal majority voting (TMV) 400 counter with an integrated bias quantification circuitry. Temporal Majority Voting comprises of the process of collecting multiple measurements, through repeated measurements, and determining an output value based on the values (or votes) of each measurement. If the number of positive value (votes) exceeds a certain majority (or threshold), the output is said to be positive (1), otherwise the output is negative (0). When doing temporal majority voting or TMV, a number of consecutive measurements of a single cell are considered. In some embodiments, each cell is measured for some consecutive cycles (e.g., 127 consecutive cycles). Other number of consecutive cycles may also be used. In some embodiments, the threshold or majority of the voting is set to nearly half the number of consecutive cycles. For example, the threshold is set to (127−1)/2=63. Other threshold numbers may also be used. This is a good way to decrease the noise on cells that do not always power up to the same value, but still have a bias towards 1 or 0 in each cell. Assuming a cell that powers up to '0' 90% of the times and to '1' 10% of the times, then of a TMV over 127 measurements is done with majority threshold of 63, the output of the TMV on this cell may give a '0' 99% of the times and '1' 1% of the times. Continuing with this example, if powering up to '1' is considered erroneous for this cell, the probability of this error occurring has decreased from 10% to less than 1% by performing the TMV. However, applying TMV in this example requires 127 times more time, so it exchanges or trades-off running time of the PUF against error probability of the output.

In some embodiments, a TMV up/down counter 400 is used that progressively counts up and switches into down counting mode on reaching saturation value. For example, a 6-bit up/down counter is used for counter 400. In some embodiments, the counter 400 comprises of flip-flops T0 402, T1 404, T2 406, T3 408, T4 410, T5 412, FF 414, AND functions A1, A2, A3, A4, A5, A6, A7, A8, A9, A10, A11, A12, A13, A14, and OR function O1, multiplexers M1, M2, M3, M4, and M5, coupled together as shown. The TMV 400 operation is synchronized by the clock input 418, and the input data from the cells is provided at "input" 416. In some embodiments, the TMV counts can be a range of values (e.g., 1 to 127). The low counts and high counts from a cell mean stable values, and the counts in the middle are associated with unstable cells. In some embodiments, from these counts, the most 4 unstable ones are selected. The TMV 400 comprises of a modified up counter, which when reaching the saturation may start down counting. In some embodiments, the saturation count is reached at a threshold number (e.g., 63), after which the counter may start down counting. In one example, for 127 counts, for the first 63 counts, the TMV counter may count up, and then may start down counting back to zero. In such an embodiment, when the value of the count is high, it indicates measurements from an unstable cell, and when the value of the count is low, it indicates the measurements are of a stable cell. The TMV 400 is also computing the bias and providing bias quantification information, which comprises a measure of a cell's instability. The output of the counter is sitting at the output of T0 402, T1 404, T2 406, T3 408, T4 410, T5 412. In some embodiments, at the end of certain number of clock cycles (e.g., 128 cycles), if T5=1, then the counter value is more than 32; if T5=1 and T4=1, then value of the counter is more than 48 (32+16). So the cell has a counter value between 48 and 63, which means that the cell has a bias less than 25%. Similarly, in the other extreme example case, if T5=1, T4=1, T3=1, T2=1, T1=1 and T0=1, then the bias is less than 0.7. Therefore, depending on the values of T1-T5, the output 420 of A10, A11, A12, A13 and A14 may indicate the bias values of 0.07, 0.15, 0.03, 0.62, 0.125 and 0.25, respectively; which is reflected in the multiplexer output "Max bias" 422. The final count value read from the TMV counters can hence be directly used to quantify bias without any additional post-processing hardware. In addition to accumulating the absolute TMV count, this circuit indicates whether a given cell in the entropy source (ES) array has a bias that in the worst case does not exceed a threshold e.g., 25%, 12.5%, 6.125%, 3.1%, 1.5%, or 0.75%. The bias quantification information is to identify the bi-stable cross-coupled inverter cells in the entropy source array that are unstable (i.e. least biased or unbiased). Such integrated bias quantification circuitry enables quick selection of unbiased cells or least biased cells for TRNG operation without requiring hardware to explicitly compare the absolute TMV counter values against a reference. The output of the circuit including A10, A11, A12, A13, A14 and multiplexer 421 (shown in dotted block 424) is used to build the Bias Map.

It should be evident to those skilled in the art that the TMV 6-bit up/down counter 400 circuitry could be extended to any number of bits. In general for an N bit up/down counter, the architecture would require N counting flip-flops, and the similarly extended corresponding logic.

Figure 5:
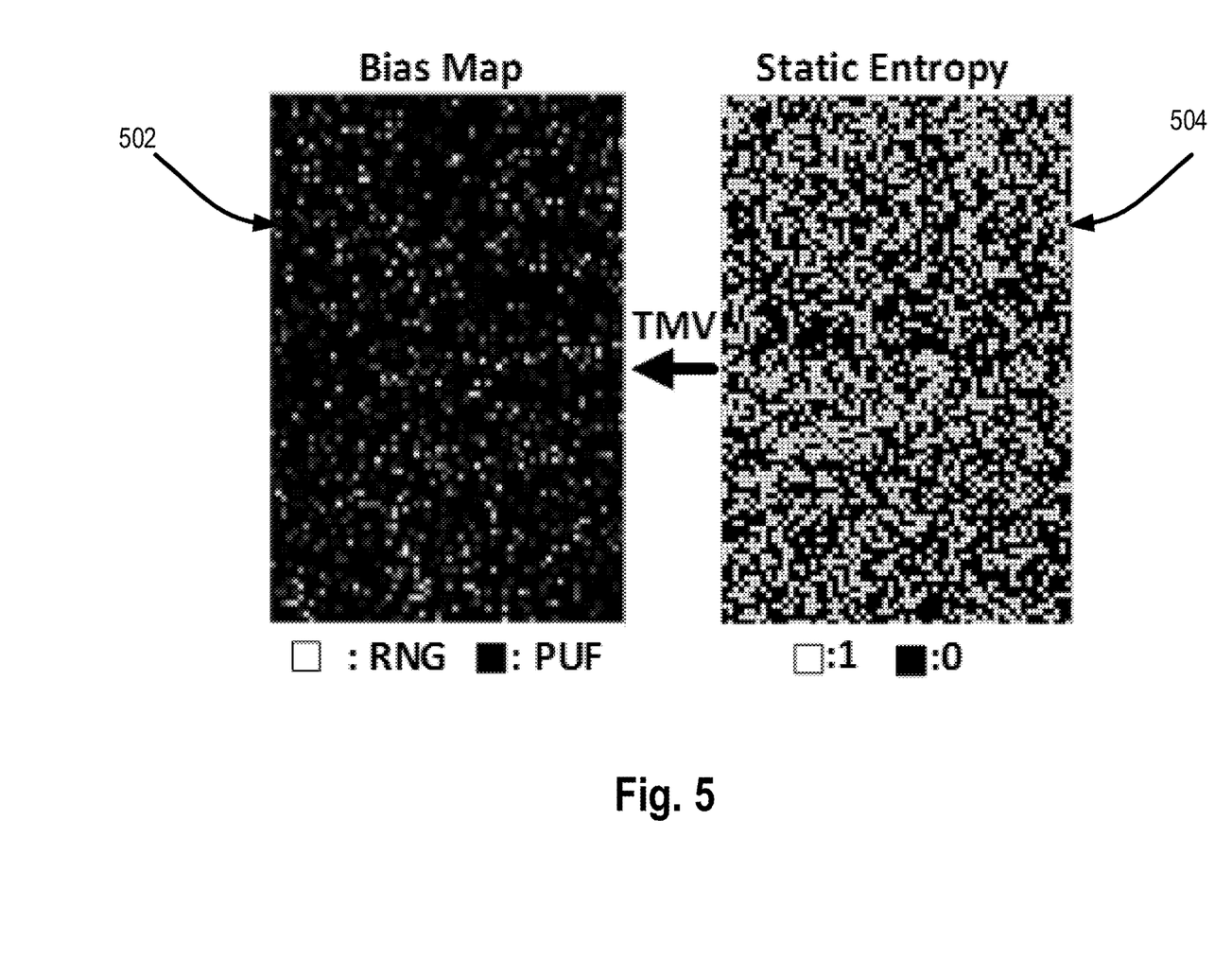
FIG. 5 illustrates a visual mapping of a static entropy source to a Bias Map, according to some embodiments.

FIG. 5 illustrates a visual mapping of a static entropy source to a Bias Map. The speckle pattern 504 illustrates the static entropy (e.g., used for PUF key derivation) measured from six 1024-bit ES arrays. The white speckles represent a cell within the array with output of "1" and the black speckles represent a cell with an output of "0". The speckle pattern 502 is derived from the raw responses from the ES array undergoing temporal majority voting, wherein the output of each cell is accumulated for some consecutive cycles (e.g., 127 in FIG. 5), to quantify their inherent bias. The speckle pattern 502 on the left illustrate bias distribution marking off black and white cells as candidates for static and dynamic entropy generation respectively. The white cells correspond to unstable cells to be used for RNG generation, and the black cells represent the more stable cells to be used for PUF generation. In some embodiments, the Entropy Source Selection (ESS) circuitry is to receive the bias quantification information for each cell, and is to generate the Bias Map based on that information. In some embodiments, the Bias Map is to record the bias, associated with each cell in the source array. In some examples, the most unbiased entries in the Bias Map are candidates for RNG generation. In some embodiments, the ES S circuitry 210 is to generate an entropy source selection set comprising of the top N most unstable entropy sources based on the Bias Map, where N is an integer number. In some embodiments, the ESS circuitry 210 is to generate an entropy source selection set comprising of the 4 most unstable entropy sources based on the Bias Map.

Figure 6:
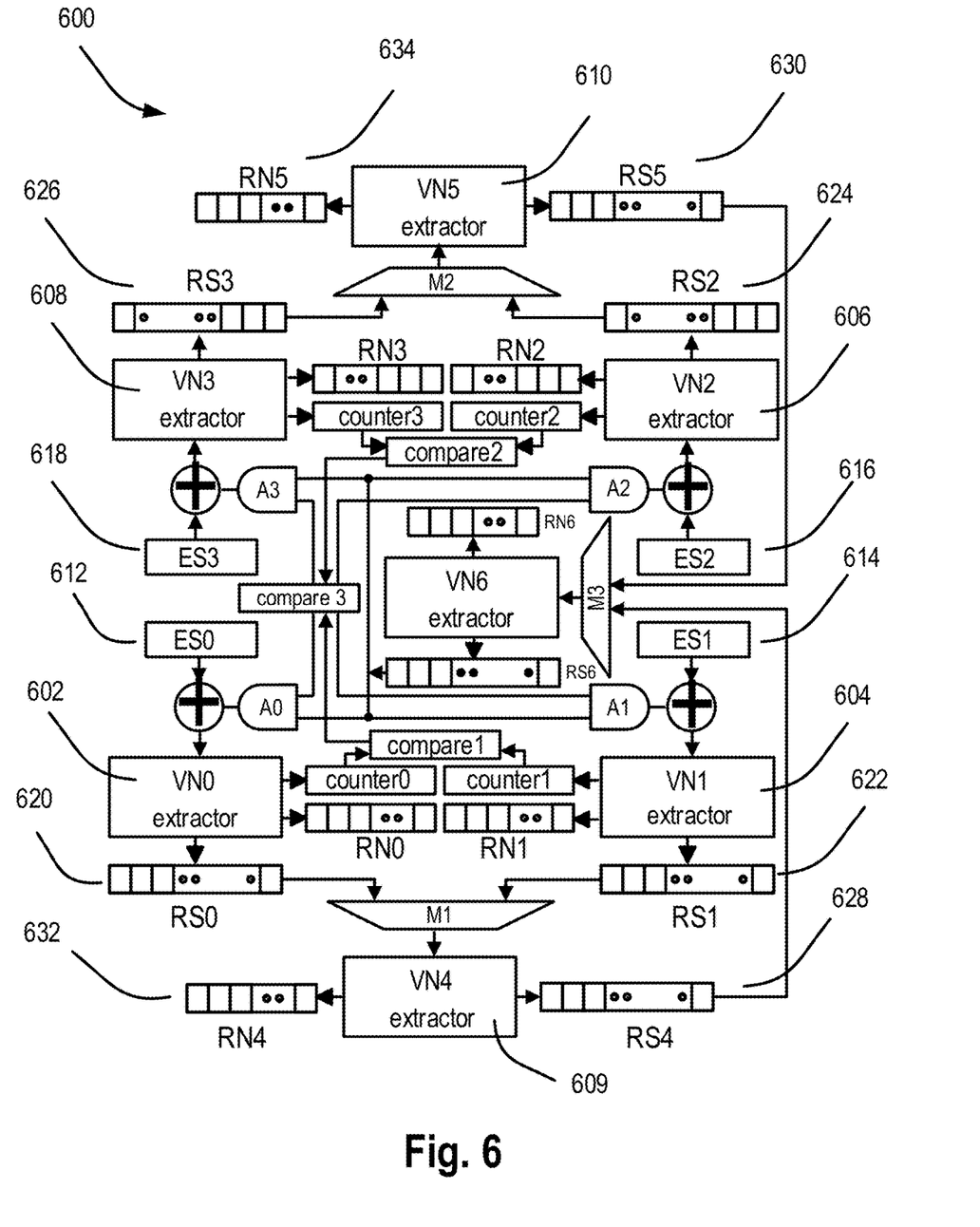
FIG. 6 illustrates a block diagram of a Light-weight Hierarchical Von Neumann (HVN) Extractor, according to some embodiments.

FIG. 6 illustrates a block diagram of a Light-weight Hierarchical Von Neumann (VN) or HVN Extractor 600, according to some embodiments. The figures illustrates a block diagram of a tri-level VN extractor architecture harvesting entropy from 4 sources, ES0 (612, ES1(614), ES2

(616), and ES3(618). However, other number of sources, may also be used. In some embodiments, at the first level, the architecture comprises four VN extractors VN0(602), VN1(604), VN2(608), and VN3(606); and four entropy sources, ES0(612, ES1(614), ES2(616), and ES3(618). The first level also includes throughput monitors, including counter functions, "counter0", "counter1", "counter2", and "counter3"; and comparator functions "compare1", "compare2", and "compare3" coupled together as shown.

In some embodiments, each VN extractor generates a random bit only when a raw-bit flips (01 or 10 patterns), resulting in a throughput that is inversely proportional to the amount of bias inherently present in the ES. It thus filters out intermittent periods of stable operation, thereby always guaranteeing a high quality random stream. As a result, the four VN extractors at the first level are to generate random streams RN0, RN1, RN2, and RN3. Each VN extractor also is to generate a residual stream at a threshold output, e.g., 50% throughput, (e.g., 00/11 generates 0 while 01/10 generates 1), which is merged onto a neighboring residual stream for second level VN processing. The four VN extractors are to generate residual streams RS0(620), RS1(622), RS2(624), and RS3(626). At the second level, the architecture includes two VN extractors, VN4(609), and VN5(610). Similar to the first level, each VN extractor in the second level is to generate a random bit when a raw-bit flips (01 or 10 patterns), resulting in a throughput that is inversely proportional to the amount of bias inherently present in the residual stream. It thus filters out intermittent periods of stable operation, thereby always guaranteeing a high quality random stream.

The two VN extractors generate random streams RN4 (632), and RN5(634). The two VN extractors also generate residual streams RS4(628) and RS5(630). In this example, the resulting residual stream is generated at 50% throughput (e.g., 00/11 generates 0 while 01/10 generates 1), which is further merged onto a neighboring residual stream for third level VN processing. At the third level, the architecture includes one VN extractor, VN6. The VN extractor VN6 in the third level is to generate a random bit when a raw-bit flips (01 or 10 patterns), resulting in a throughput that is inversely proportional to the amount of bias inherently present in the input residual stream. The VN extractor VN6 generates random stream RN6 and residual stream RS6.

Throughput monitors continuously evaluate the quality of raw ES streams, and opportunistically top off the stream with the least native entropy with the residual entropy stream gathered at the final VN extractor VN6. The throughout monitoring quantifies how well the VN units are performing. Each counter is to count the number of bits its coupled VN unit produces, and for each VN pair (VN0, VN1) and (VN2, VN3), the counts are to be compared respectively by "compare1" and "compare2" functions. The output of each compare function is to select the VN extractor which produces least number (less throughput) of bits.

The outputs of "compare1" and "compare2" then are to be provided to "compare3", which makes the final selection of the VN extractor which has the least number of bits (e.g., counts) among the four VN extractors. Each VN extractor at the first level is to process the raw bits generated from the TRNG candidate cells from corresponding ES arrays, and is to generate a random stream and a residual left-over entropy stream. Furthermore, the level one also is to implement residual entry harvesting. The residual entry harvesting to be achieved by combining the output of the ES arrays with the residual stream generated by VN6, based on the output of "compare3" through AND functions A0, A1, A2, and A3.

Since "compare3" is to produce an output of "1" corresponding to one of the VN extractors with the least number of output bit counts, one of the four VN extractors is to get activated for residual entry harvesting. For the selected VN extractor block, its ES array input is to be combined with the residual stream generated by VN6. One purpose of combining is to fix the problem of low count at the output of the selected VN extractor.

It should be evident to those skilled in the art that the Light-weight Hierarchical Von Neumann Extractor architecture 600 could be extended to any number of ES sources. In general for an N number of ES sources, the architecture would requires 2N-1 VN extractor units, and the similarly extended corresponding logic.

Figure 7:
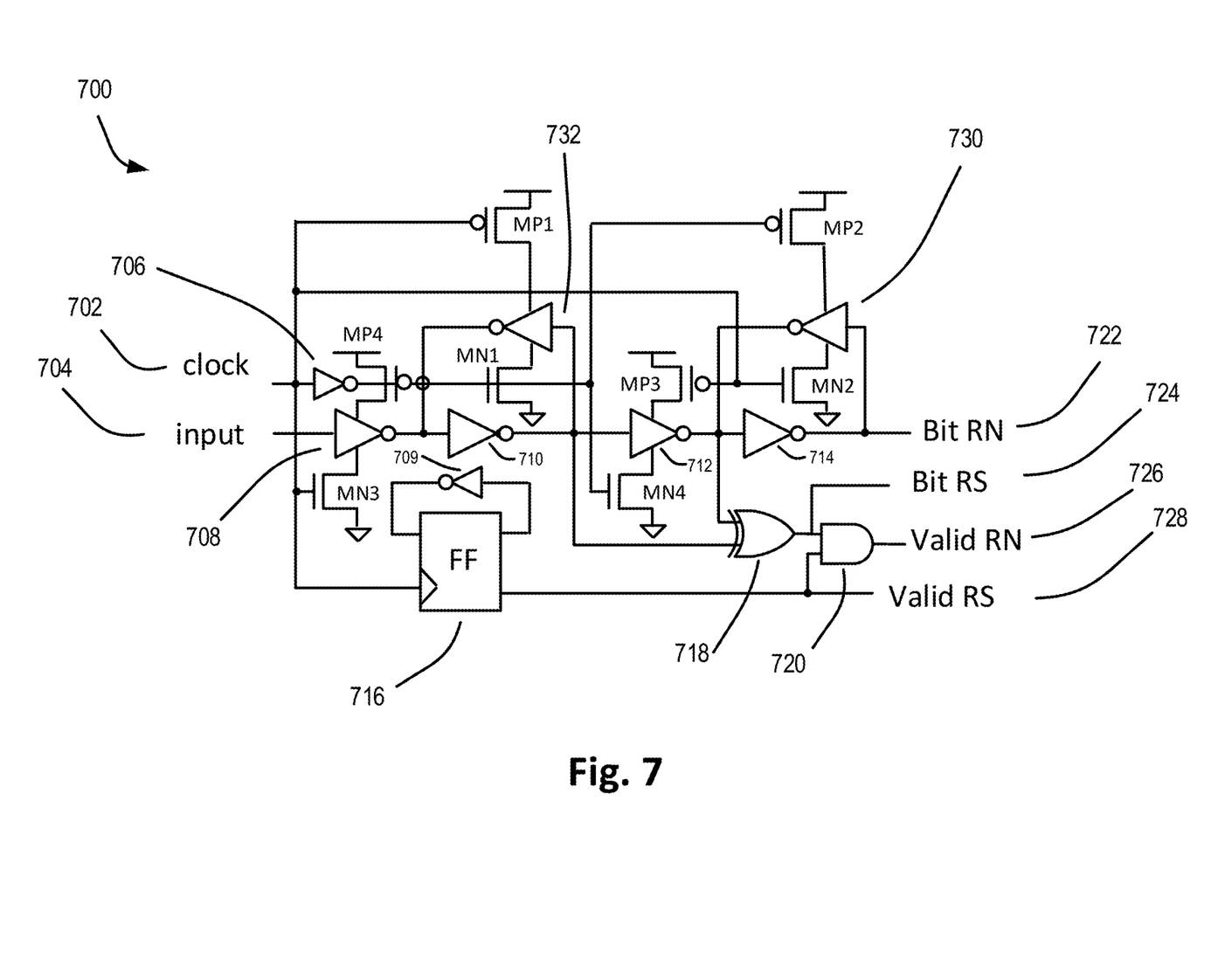
FIG. 7 illustrates a circuit diagram of a VN extractor, according to some embodiments.

FIG. 7 illustrates a circuit diagram of a VN extractor according to some embodiments. In some embodiments, the light-weight design spans 20 logic gates, enabling seamless extension of the hierarchical extractor architecture for harvesting entropy from more candidate cells to increase throughput. In some embodiments, the VN extractor circuitry 700 comprises n-type transistor MN1, MN2, MN3, MN4, and p-type transistors MP1, MP2, MP3, MP4, inverters 706, 708, 709, 710, 712, 714, 730, 732 and buffers 304, 305, and Flip Flop (FF) 716, EXOR logic 718 and AND logic 720, coupled together as shown.

The "Clock" input 702 controls the circuits' operational timing, so that all operations are synchronized with a common clock. The incoming input data bits are represented by "input" 704. In some embodiments, the VN extractor has four outputs, "bit RN" 722, "bit RS" 724, "Valid RN" 726, and "Valid RS" 728. The pair "Bit RN" and "Valid RN" represent the "random stream" output. The pair "Bit RS" and "Valid RS" represent the "residual stream" output. For the "random stream", the VN extractor circuit looks for transitions in two consecutive input bits. If there are no transitions, meaning input "input" is 11 or 00, then the output "bit RN" is discarded ("Valid RN" is 0). However, if there is a transition, meaning that the input is 10 or 01, then the "Valid RN" is 1, and output "Bit RN" is 0 if the input sequence is 01, and the output "Bit RN" is 1 if the input sequence is 10. The "Bit RN" output, in this example, may have a varying throughput, however on average its throughput may be 25% of the input throughput. For the "residual stream", the VN extractor circuit also looks for transitions in two consecutive input bits. If there are no transitions, meaning input "input" is 11 or 00, then the output "Bit RS" is discarded. "Valid RS" is 1 every alternative cycle. However, if there is a transition, meaning that the input is 10 or 01, then the output "Bit RS" is 1. Therefore, the VN extractor circuit may create a "1" output every alternative cycle. As a result, the "residual stream" may have a fixed throughput, which may be 50% of the input throughput.

Figure 8:
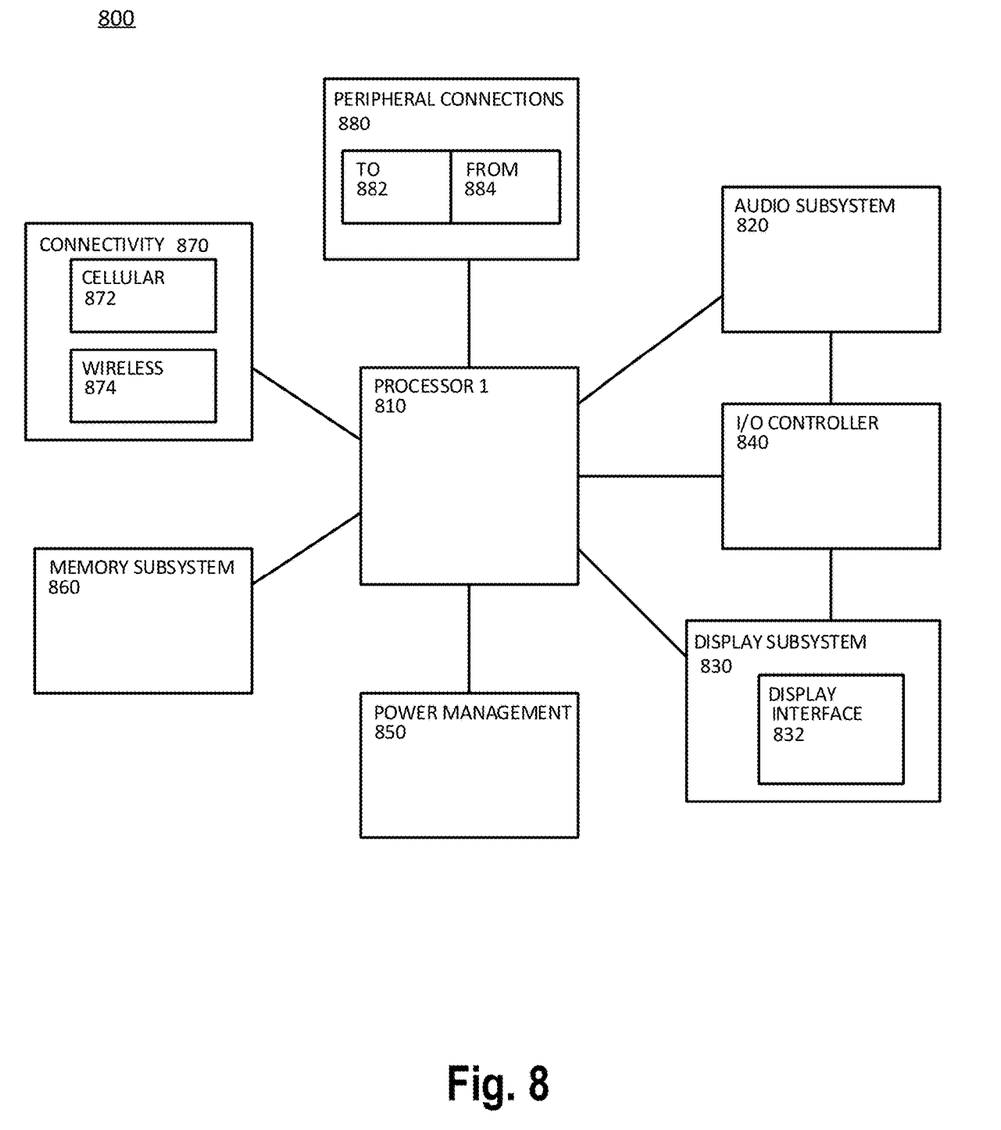
FIG. 8 illustrates a smart device or a computer system or a SoC (System-on-Chip) which includes a random number generator according to some embodiments.

FIG. 8 illustrates a smart device or a computer system or a SoC (System-on-Chip) which includes a random number generator according to some embodiments. In some embodiments, computing device 800 represents a mobile computing device, such as a computing tablet, a mobile phone or smart-phone, a wireless-enabled e-reader, or other wireless mobile device. It will be understood that certain components are shown generally, and not all components of such a device are shown in computing device 800. In some embodiments, one or more components of computing device 800, for example cellular 872 and/or wireless 874, include a random number generator as described with reference to various embodiments, for example coupled with a transceiver.

In some embodiments, computing device 800 includes a first processor 810. The various embodiments of the present disclosure may also comprise a network interface within 870 such as a wireless interface so that a system embodiment may be incorporated into a wireless device, for example, cell phone or personal digital assistant.

In some embodiments, processor 810 can include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting the computing device 800 to another device. The processing operations may also include operations related to audio I/O and/or display I/O.

In some embodiments, computing device 800 includes audio subsystem 820, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 800, or connected to the computing device 800. In some embodiments, a user interacts with the computing device 800 by providing audio commands that are received and processed by processor 810.

Display subsystem 830 represents hardware (e.g., display devices) and software (e.g., drivers) components that provide a visual and/or tactile display for a user to interact with the computing device 800. Display subsystem 830 includes display interface 832, which includes the particular screen or hardware device used to provide a display to a user. In some embodiments, display interface 832 includes logic separate from processor 810 to perform at least some processing related to the display. In some embodiments, display subsystem 830 includes a touch screen (or touch pad) device that provides both output and input to a user.

I/O controller 840 represents hardware devices and software components related to interaction with a user. I/O controller 840 is operable to manage hardware that is part of audio subsystem 820 and/or display subsystem 830. Additionally, I/O controller 840 illustrates a connection point for additional devices that connect to computing device 800 through which a user might interact with the system. For example, devices that can be attached to the computing device 800 might include microphone devices, speaker or stereo systems, video systems or other display devices, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of the computing device 800. Additionally, audio output can be provided instead of, or in addition to display output. In another example, if display subsystem 830 includes a touch screen, the display device also acts as an input device, which can be at least partially managed by I/O controller 840. There can also be additional buttons or switches on the computing device 800 to provide I/O functions managed by I/O controller 840.

In some embodiments, I/O controller 840 manages devices such as accelerometers, cameras, light sensors or other environmental sensors, or other hardware that can be included in the computing device 800. The input can be part of direct user interaction, as well as providing environmental input to the system to influence its operations (such as filtering for noise, adjusting displays for brightness detection, applying a flash for a camera, or other features).

In some embodiments, computing device 800 includes power management 850 that manages battery power usage, charging of the battery, and features related to power saving operation. Memory subsystem 860 includes memory devices for storing information in computing device 800. Memory can include nonvolatile (state does not change if power to the memory device is interrupted) and/or volatile (state is indeterminate if power to the memory device is interrupted) memory devices. Memory subsystem 860 can store application data, user data, music, photos, documents, or other data, as well as system data (whether long-term or temporary) related to the execution of the applications and functions of the computing device 800.

Elements of embodiments are also provided as a machine-readable medium (e.g., memory 860) for storing the computer-executable instructions. The machine-readable medium (e.g., memory 860) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 870 includes hardware devices (e.g., wireless and/or wired connectors and communication hardware) and software components (e.g., drivers, protocol stacks) to enable the computing device 800 to communicate with external devices. The computing device 800 could be separate devices, such as other computing devices, wireless access points or base stations, as well as peripherals such as headsets, printers, or other devices.

Connectivity 870 can include multiple different types of connectivity. To generalize, the computing device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 874 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 880 include hardware interfaces and connectors, as well as software components (e.g., drivers, protocol stacks) to make peripheral connections. It will be understood that the computing device 800 could both be a peripheral device ("to" 882) to other computing devices, as well as have peripheral devices ("from" 884) connected to it. The computing device 800 commonly has a "docking" connector to connect to other computing devices for purposes such as managing (e.g., downloading and/or uploading, changing, synchronizing) content on computing device 800. Additionally, a docking connector can allow computing device 800 to connect to certain peripherals that allow the computing device 800 to control content output, for example, to audiovisual or other systems.

In addition to a proprietary docking connector or other proprietary connection hardware, the computing device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Figure 9:
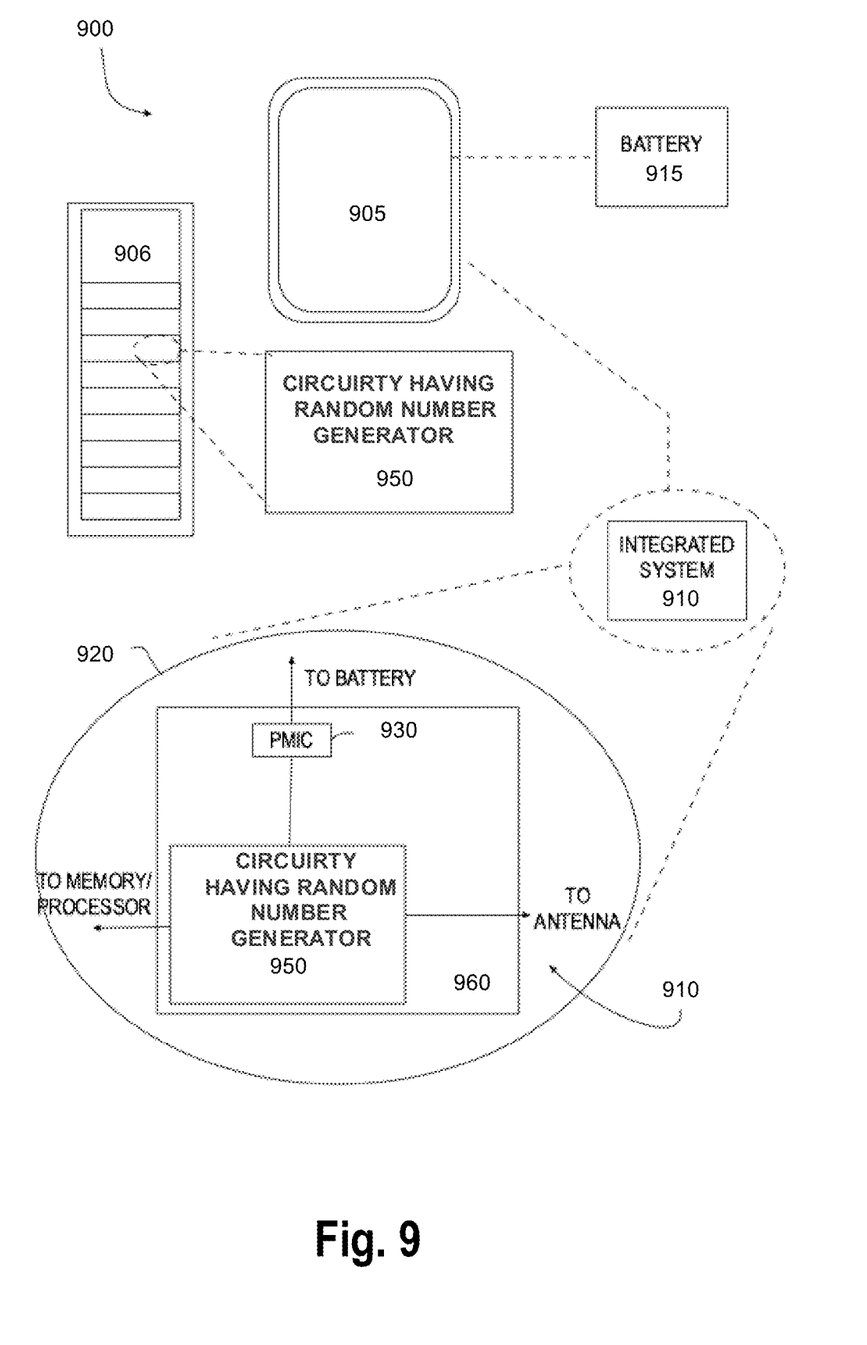
FIG. 9 illustrates a mobile computing platform and a data server machine employing a random number generator, in accordance with some embodiments.

FIG. 9 illustrates a system 900 in which a mobile computing platform 905 and/or a data server machine 906 employs circuitry including at least one random number generator, for example in accordance with some embodiments described elsewhere herein. The server machine 906 may be any commercial server, for example including any number of high-performance computing platforms disposed within a rack and networked together for electronic data processing, which in the exemplary embodiment includes a circuitry 950. The mobile computing platform 905 may be any portable device configured for each of electronic data display, electronic data processing, wireless electronic data transmission, or the like. For example, the mobile computing platform 905 may be any of a tablet, a smart phone, laptop computer, etc., and may include a display screen (e.g., a capacitive, inductive, resistive, or optical touchscreen), a chip-level or package-level integrated system 910, and a battery 915.

Whether disposed within the integrated system 910 illustrated in the expanded view 920, or as a stand-alone discrete or packaged multi-chip module within the server machine 906, the circuit includes at least one random number generator, for example in accordance with some embodiments described elsewhere herein. Circuitry 950 may be further attached to a board, a substrate, or an interposer 960 along with a power management integrated circuit (PMIC). Functionally, PMIC 930 may perform battery power regulation, DC-to-DC conversion, etc., and so has an input coupled to battery 915 and with an output providing a current supply to other functional modules.

Circuitry 950, in some embodiments, includes RF (wireless) integrated circuitry (RFIC) further including a wideband RF (wireless) transmitter and/or receiver (TX/RX including a digital baseband and an analog front end module comprising a power amplifier on a transmit path and a low noise amplifier on a receive path). The RFIC includes at least one random number generator, for example in a over-voltage protection circuit as describe elsewhere herein. The RFIC has an output coupled to an antenna (not shown) to implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the invention is not limited to the embodiments so described, but can be practiced with modification and alteration without departing from the scope of the appended claims. For example the above embodiments may include specific combinations of features as further provided in examples below.

Example 1. In one example, an apparatus is provided comprising: an entropy source to produce a first random sequence of bits, wherein the entropy source comprises an array of bi-stable cross-coupled inverter cells; a first circuitry coupled to the entropy source, wherein the first circuitry is to receive the first random sequence and to generate a bias quantification information; and a second circuitry coupled to the first circuitry, wherein the second circuitry is to receive the bias quantification information and to generate an entropy source selection (ESS) set.

Example 2. The apparatus of Example 1, wherein the entropy source comprises a Physically Unclonable Function (PUF) array.

Example 3. The apparatus of Examples 1-2, the bi-stable cross-coupled inverter cells comprise identically laid-out matched devices.

Example 4. The apparatus of Examples 1-3, wherein the first circuitry comprises a Temporal Majority Voting (TMV) circuitry.

Example 5. The apparatus of Examples 1-4, wherein the Temporal Majority Voting (TMV) circuitry is to accumulate an output of each bi-stable cross-coupled inverter cell for some consecutive cycles to generate the bias quantification information.

Example 6. The apparatus of Examples 1-5, wherein the Temporal Majority Voting (TMV) circuitry comprises an up/down counter that progressively counts up and switches into down counting mode on reaching saturation value.

Example 7. The apparatus of Examples 1-6, wherein the bias quantification information is to identify the bi-stable cross-coupled inverter cells in the entropy source array that are unstable.

Example 8. The apparatus of Examples 1-7, wherein the TMV circuitry comprises of a bias quantification circuitry to enable quick selection of unbiased or least biased cells for TRNG operation.

Example 9. The apparatus of Examples 1-8, wherein the second circuitry comprises an Entropy Source Selection circuitry, to generate a Bias Map based on the bias quantification information.

Example 10. The apparatus of Examples 1-9, wherein the Entropy Source Selection circuitry is to generate the entropy source selection set based on the Bias Map.

Example 11. The apparatus of Examples 1-10, wherein the entropy source selection set comprises the N most unstable bi-stable cross-coupled inverter cells in the array, wherein N is an integer number.

Example 12. The apparatus of Examples 1-11, wherein the entropy source selection set comprises top four unstable entropy sources.

Example 13. In another Example, an apparatus is provided to generate random bits comprising of: an entropy source to produce a first random sequence of bits, wherein the entropy source comprises an array of bi-stable cross-coupled inverter cells; a first circuitry coupled to the entropy source, wherein the first circuitry to generate an entropy source selection set; and a second circuitry coupled to the entropy source and the first circuitry, wherein the second circuitry is to receive the first random sequence and the entropy source selection set, and wherein the second circuitry is to generate a second random sequence.

Example 14. The apparatus of Examples 13, wherein the entropy source comprises a Physically Unclonable Function (PUF) array.

Example 15. The apparatus of Examples 13-14, wherein the bi-stable cross-coupled inverter cells comprise of identically laid-out matched devices.

Example 16. The apparatus of Examples 13-15, wherein the entropy source selection set comprises of the N most unstable bi-stable cross-coupled inverter cells in the array, wherein N is an integer number.

Example 17. The apparatus of Examples 13-16, wherein the entropy source selection set comprises of the top four unstable entropy sources.

Example 18. The apparatus of Examples 13-17, wherein the second circuitry comprises a Hierarchical Von Neumann (HVN) extractor circuitry.

Example 19. The apparatus of Examples 13-18, wherein the Hierarchical Von Neumann (HVN) extractor block, comprises of at least two Von Neumann (VN) extractor circuits.

Example 20. In another Example, a system is provided comprising: a memory; a processor coupled to the memory, wherein the processor comprises: an entropy source to produce a first random sequence of bits, wherein the entropy source comprises an array of bi-stable cross-coupled inverter cells; a first circuitry coupled to the entropy source, wherein the first circuitry is to receive the first random sequence and to generate a bias quantification information; and a second circuitry coupled to the first circuitry, wherein the second circuitry is to receive the bias quantification information and to generate an entropy source selection set.

Example 21. The system of Example 20, wherein the entropy source comprises a Physically Unclonable Function (PUF) array.

Example 22. The system of Examples 20-21, wherein the bi-stable cross-coupled inverter cells comprise identically laid-out matched devices.

Example 23. The system of Examples 20-22, wherein the first circuitry comprises a Temporal Majority Voting (TMV) circuitry.

Example 24. The system of Examples 20-23, wherein the Temporal Majority Voting (TMV) circuitry is to accumulate an output of each bi-stable cross-coupled inverter cell for some consecutive cycles to generate the bias quantification information.

Example 25. The system of Examples 20-24, wherein the Temporal Majority Voting (TMV) circuitry comprises an up/down counter that progressively counts up and switches into down counting mode on reaching saturation value.

Example 26. The system of Examples 20-25, wherein the bias quantification information is to identify the bi-stable cross-coupled inverter cells in the entropy source array that are unstable.

Example 27. The system of Example 20-26, wherein the TMV circuitry comprises of a bias quantification circuitry to enable quick selection of unbiased or least biased cells for TRNG operation.

Example 28. The system of Examples 20-27, wherein the second circuitry comprises an Entropy Source Selection circuitry, to generate a Bias Map based on the bias quantification information.

Example 29. The system of Examples 20-28, wherein the Entropy Source Selection circuitry to generate the entropy source selection set based on the Bias Map.

Example 30. The system of Examples 20-29, wherein the entropy source selection set comprises the N most unstable bi-stable cross-coupled inverter cells in the array, wherein N is an integer number.

Example 31. The system of Examples 20-30, wherein the entropy source selection set comprises top four unstable entropy sources.

Example 32. In another Example, a system is provided to generate random bits comprising of: a memory; a processor coupled to the memory, wherein the processor comprises: an entropy source to produce a first random sequence of bits, wherein the entropy source comprises an array of bi-stable cross-coupled inverter cells; a first circuitry coupled to the entropy source, wherein the first circuitry to generate an entropy source selection set; and a second circuitry coupled to the entropy source and the first circuitry, wherein the second circuitry is to receive the first random sequence and the entropy source selection set, and wherein the second circuitry is to generate a second random sequence.

Example 33. The system of Examples 32, wherein the entropy source comprises a Physically Unclonable Function (PUF) array.

Example 34. The system of Examples 32-33, wherein the bi-stable cross-coupled inverter cells comprise of identically laid-out matched devices.

Example 35. The system of Examples 32-34, wherein the entropy source selection set comprises of the N most unstable bi-stable cross-coupled inverter cells in the array, wherein N is an integer number.

Example 36. The system of Examples 32-35, wherein the entropy source selection set comprises of the top four unstable entropy sources.

Example 37. The system of Examples 32-36, wherein the second circuitry comprises a Hierarchical Von Neumann (HVN) extractor circuitry.

Example 38. The system of Examples 32-37, wherein the Hierarchical Von Neumann extractor block, comprises of at least two Von Neumann (VN) extractor circuits.

However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. An apparatus comprising:
   an entropy source to produce a first random sequence of bits, wherein the entropy source comprises an array of bi-stable cross-coupled inverter cells;
   a first circuitry coupled to the entropy source, wherein the first circuitry is to receive the first random sequence and to generate a bias quantification information; and
   a second circuitry coupled to the first circuitry, wherein the second circuitry is to receive the bias quantification information and to generate an entropy source selection (ESS) set, wherein the second circuitry comprises an Entropy Source Selection circuitry, to generate a Bias Map based on the bias quantification information.

2. The apparatus of claim 1, wherein the entropy source comprises a Physically Unclonable Function (PUF) array, and wherein the bi-stable cross-coupled inverter cells comprise identically laid-out matched devices.

3. The apparatus of claim 1, wherein the first circuitry comprises a Temporal Majority Voting (TMV) circuitry, and wherein the TMV circuitry is to accumulate an output of each bi-stable cross-coupled inverter cell for some consecutive cycles to generate the bias quantification information.

4. The apparatus of claim 3, wherein the TMV circuitry comprises an up/down counter that is to progressively count up and to switch into down counting mode on reaching saturation value, and wherein the TMV circuitry comprises of a bias quantification circuitry to enable quick selection of unbiased or least biased cells for TRNG operation.

5. The apparatus of claim 3, wherein the TMV circuitry comprises a bias quantification circuitry to enable quick selection of unbiased or least biased cells for TRNG operation.

6. The apparatus of claim 1, wherein the bias quantification information is to identify the bi-stable cross-coupled inverter cells in the array of the entropy source that are unstable.

7. The apparatus of claim 1, wherein the Entropy Source Selection circuitry is to generate the entropy source selection set based on the Bias Map.

8. The apparatus of claim 1, wherein the entropy source selection set comprises N most unstable bi-stable cross-coupled inverter cells in the array, wherein N is an integer number.

9. An apparatus to generate random bits, the apparatus comprising:
an entropy source to produce a first random sequence of bits, wherein the entropy source comprises an array of bi-stable cross-coupled inverter cells;
a first circuitry coupled to the entropy source, wherein the first circuitry is to generate an entropy source selection set; and
a second circuitry coupled to the entropy source and the first circuitry, wherein the second circuitry is to receive the first random sequence and the entropy source selection set, and wherein the second circuitry to generate a second random sequence, wherein the second circuitry comprises a Hierarchical Von Neumann (HVN) extractor circuitry, and wherein the Hierarchical Von Neumann (HVN) extractor circuitry comprises of at least two Von Neumann (VN) extractor circuits.

10. The apparatus of claim 9, wherein the entropy source comprises a Physically Unclonable Function (PUF) array, and wherein the bi-stable cross-coupled inverter cells comprise of identically laid-out matched devices.

11. The apparatus of claim 9, wherein the entropy source selection set comprises N most unstable bi-stable cross-coupled inverter cells in the array of the entropy source, wherein N is an integer number.

12. A system comprising:
a memory;
a processor coupled to the memory; and
a wireless interface to allow the processor to communicate with another device, wherein the processor comprises:
an entropy source to produce a first random sequence of bits, wherein the entropy source comprises an array of bi-stable cross-coupled inverter cells;
a first circuitry coupled to the entropy source, wherein the first circuitry is to receive the first random sequence and to generate a bias quantification information; and
a second circuitry coupled to the first circuitry, wherein the second circuitry is to receive the bias quantification information and to generate an entropy source selection set, wherein the second circuitry comprises an Entropy Source Selection circuitry, to generate a Bias Map based on the bias quantification information.

13. The system of claim 12, wherein the entropy source comprises a Physically Unclonable Function (PUF) array, and wherein the bi-stable cross-coupled inverter cells comprise identically laid-out matched devices.

14. The system of claim 12, wherein the first circuitry comprises a Temporal Majority Voting (TMV) circuitry, and wherein the TMV circuitry is to accumulate an output of each bi-stable cross-coupled inverter cell for some consecutive cycles to generate the bias quantification information.

15. The system of claim 14, wherein the TMV circuitry comprises an up/down counter that is to progressively count up and to switch into down counting mode on reaching saturation value, and wherein the TMV circuitry comprises of a bias quantification circuitry to enable quick selection of unbiased or least biased cells for TRNG operation.

16. The system of claim 14, wherein the TMV circuitry comprises a bias quantification circuitry to enable quick selection of unbiased or least biased cells for TRNG operation.

17. The system of claim 12, wherein the bias quantification information is to identify the bi-stable cross-coupled inverter cells in the array of the entropy source that are unstable.

18. The system of claim 12, wherein the Entropy Source Selection circuitry is to generate the entropy source selection set based on the Bias Map.

19. The system of claim 12, wherein the entropy source selection set comprises N most unstable bi-stable cross-coupled inverter cells in the array, wherein N is an integer number.

20. An apparatus comprising:
an entropy source to produce a first random sequence of bits, wherein the entropy source comprises an array of bi-stable cross-coupled inverter cells;
a first circuitry coupled to the entropy source, wherein the first circuitry is to receive the first random sequence and to generate a bias quantification information, wherein the first circuitry comprises a Temporal Majority Voting (TMV) circuitry, wherein the TMV circuitry comprises an up/down counter that is to progressively count up and to switch into down counting mode on reaching saturation value; and
a second circuitry coupled to the first circuitry, wherein the second circuitry is to receive the bias quantification information and to generate an entropy source selection (ESS) set.

21. The apparatus of claim 20, wherein the TMV circuitry is to accumulate an output of each bi-stable cross-coupled inverter cell for some consecutive cycles to generate the bias quantification information.

22. The apparatus of claim 20, wherein the TMV circuitry comprises a bias quantification circuitry to enable quick selection of unbiased or least biased cells for TRNG operation.

23. The apparatus of claim 20, wherein the second circuitry comprises an Entropy Source Selection circuitry, to generate a Bias Map based on the bias quantification information.

* * * * *